(12) United States Patent
Holtmann et al.

(10) Patent No.: US 6,477,446 B1
(45) Date of Patent: Nov. 5, 2002

(54) METHOD OF AND APPARATUS FOR CONTROLLING THE OPERATION OF A FLUID PRESSURE REGULATING VALVE

(75) Inventors: Ludger Holtmann, Karlsruhe (DE); Michael Reuschel, Bühl (DE); Manfred Homm, Bühl-Neusatz (DE); Ari Ojamies, Georgensgmünd (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/373,284

(22) Filed: Aug. 12, 1999

(30) Foreign Application Priority Data

Aug. 17, 1998 (DE) .......................................... 198 37 157

(51) Int. Cl.$^7$ ................................................ G05B 1/38
(52) U.S. Cl. ........................................ 700/281; 700/203
(58) Field of Search ................................ 750/203, 281, 750/282; 137/487.5; 477/86

(56) References Cited

U.S. PATENT DOCUMENTS

| | | | |
|---|---|---|---|
| 4,581,001 A | | 4/1986 | Rattunde et al. ............ 474/214 |
| 5,046,991 A | | 9/1991 | Friedmann ................... 474/18 |
| 5,169,365 A | | 12/1992 | Friedmann ................... 474/18 |
| 5,217,412 A | | 6/1993 | Indlekofer et al. ............. 474/69 |
| 5,295,915 A | | 3/1994 | Friedmann ................... 474/18 |
| 5,393,275 A | * | 2/1995 | Okada et al. ................. 477/86 |
| 5,667,448 A | | 9/1997 | Friedmann .................... 474/18 |
| 5,679,091 A | * | 10/1997 | Salecker et al. ............... 477/86 |
| 5,711,730 A | | 1/1998 | Friedmann et al. ............ 474/18 |
| 5,728,021 A | | 3/1998 | van rooij et al. ............ 474/229 |
| 5,890,992 A | * | 4/1999 | Salecker et al. ............... 477/86 |
| 6,073,644 A | * | 6/2000 | Friedmann et al. ............. 137/1 |
| 6,116,391 A | * | 9/2000 | Kremmling et al. ........ 192/3.58 |

* cited by examiner

*Primary Examiner*—Leo Picard
*Assistant Examiner*—Kidest Bahta
(74) *Attorney, Agent, or Firm*—Darby & Darby

(57) ABSTRACT

A fluid pressure regulating valve, particularly for an automated clutch in the power train of a motor vehicle with a manually shiftable transmission, is adjustable by an electronic control unit which regulates the strength of alternating current being supplied to one or more electromagnets of the valve. The control unit receives signals from sensors which monitor the fluid pressure, the temperature and/or the RPM of one or more constituents of the motor vehicle, and such signals are processed into signals denoting differences between existing and desired pressures of fluid being supplied to and/or by the valve. These signals are compared with information stored in at least one memory of the control unit and denoting memorized differences between actual and desired current strengths. The memorized signals are altered when a comparison in the control unit indicates that the differences ascertained on the basis of signals transmitted by the sensors depart from differences denoted by the memorized information. Such processing of memorized information renders it possible to counteract the effects of wear upon and/or tolerances in assembly of parts of the power train.

17 Claims, 3 Drawing Sheets

METHOD OF AND APPARATUS FOR CONTROLLING THE OPERATION OF A FLUID PRESSURE REGULATING VALVE

BACKGROUND OF THE INVENTION

The invention relates to a method of conforming to varying parameters a selected electric control current which is being supplied to a pressure regulating valve and is memorized with additional control currents in, and can be addressed and read out from, a characteristic field in dependency upon prevailing operating conditions to serve as an actual control current.

The invention further relates to apparatus for the practice of the above outlined method.

Automation of gear shifting transmissions in the power trains of motor vehicles is gaining in popularity on several grounds including an enhancement of the comfort to the occupant(s) of the motor vehicle as well as a reduction of specific fuel consumption. One of the reasons that an automatic or automated gear shifting transmission can bring about savings in fuel consumption is that one can drive more frequently in a relatively long gear; this causes the average pressure of a combustion engine to rise and its specific fuel consumption to drop.

In accordance with a simplified automation of the power train of a motor vehicle, only the clutch is automated whereas the transmission is shifted by hand. Owing to the thus enhanced shifting comfort, the operator of the motor vehicle is more likely to shift, and to shift more frequently, into so-called long gears which brings about a reduction of fuel consumption for reasons already pointed out hereinbefore.

If the power train of a motor vehicle employs a fully automatic transmission, it is of advantage (in order to achieve savings in fuel consumption) to operate with a starter clutch in lieu of with a torque converter clutch. In order to avoid excessive slip and the need for the application of very high fluid pressures, the operation of such starter clutches must be regulated with a rather high degree of accuracy. In other words, all such operational parameters (including torque, RPM and/or others) of the power train which influence the starting and the operation of hydraulic systems being utilized to operate automated clutches must be ascertained and processed with a very high degree of precision. As already mentioned above, such undertakings must ensure that the automated clutch can operate without excessive slip as well as that the hydraulic fluid being utilized to operate various units (such as cylinder-and-piston units) of the clutch need not be subjected to relatively high or very high pressures.

It is customary to employ a pressure regulating valve (e.g., a proportionally operating pressure regulating pilot valve) as a means for determining the pressure of a suitable hydraulic fluid (such as oil) which is being conveyed to and advanced from the fluid-operated components of the automated clutch. It is also known to employ a control unit having a memory for the storage of a characteristic field with information denoting a plurality of control currents serving as desired or required currents for the operation of the pilot valve under certain specific (selected) circumstances of operation of the power train. Once the proper control current in the characteristic field of the memory has been addressed, it is thereupon utilized as the desired or required current to control the adjustment (setting) of the pilot valve in order to achieve the aforementioned objects, such as savings in fuel and avoidance of the need for control fluids having very high or extremely high pressures.

In accordance with a presently known proposal, the above outlined objects or requirements concerning adjustments of the pilot valve which regulates the pressure of hydraulic fluid flowing to various hydraulically operated units of an automated clutch can be accomplished in a simple manner by storing the information which is contained in the characteristic field in the memory of the control unit in the following way: Each fluid pressure change of a predetermined magnitude brings about or corresponds to a predetermined change of control current. The changes of control current are dependent upon the selected desired regulating current, i.e., upon the respective desired pressure and the respective temperature.

The above outlined proposal is satisfactory under ideal circumstances, e.g., if one disregards changes which develop due to progressing wear upon the constituents of the power train, manufacturing tolerances, changes in the consistency and/or other parameters of the hydraulic fluid and/or deposits of foreign matter in the fluid and/or upon the mechanical constituents of the prime mover. It has been ascertained that the just enumerated (and certain other) unpredictable changes in or departures from optimum conditions can greatly and adversely influence the operation of conventional control units which regulate the pressure of fluid being supplied to the cylinder-and-piston units and/or to other hydraulically operated components of automated clutches in the power trains of motor vehicles. In other words, presently known control units and the information stored in the memories of such control units cannot ensure the absence of slip (or excessive slip) in the automated clutch and/or excessive fuel consumption if the characteristics of the aforementioned unpredictable parameters depart from optimum values. Excessive departures of actual control or regulating pressure from the desired or required pressure can greatly affect the operation of the automated clutch as well as of the entire power train.

OBJECTS OF THE INVENTION

An object of the invention is to provide a method of regulating the pressure of hydraulic fluid being supplied to and by a fluid pressure regulating valve for use in or in conjunction with automated clutches in such a way that the quality of operation of the automated clutch is not affected (or is not unduly affected) by departures of actual fluid pressures from optimum fluid pressures in spite of progressing wear upon the mechanical parts, pronounced manufacturing and/or assembling tolerances, changes in the quality of the hydraulic fluid and/or others.

Another object of the invention is to provide a method which ensures highly satisfactory operation of the automated clutch for extended portions of useful life of the power train.

A further object of the invention is to provide a method which can be practiced by resorting to a relatively simple electronic control unit as well as to available signal generating and signal transmitting monitoring devices.

An additional object of the invention is to provide a power train wherein the operation of the automated clutch can be regulated in accordance with the above outlined method.

An additional object of the invention is to provide a method which renders it possible to avoid (or at least reduce) hysteresis in the hydraulic characteristic curve of a valve for the regulation of a consumer of a pressurized hydraulic fluid.

Still another object of the invention is to reduce the differences between the actual value and the desired or required value of the pressure of hydraulic fluid being supplied to one or more cylinder-and/piston units and/or other fluid-operated constituents of automated transmissions in the power trains of motor vehicles.

A further object of the invention is to provide a method which can be resorted to in connection with the operation of power trains in motor vehicles as well as under numerous other circumstances when the pressure of hydraulic fluid being supplied to or being discharged by a pressure regulating valve must be controlled with a high or extremely high degree of accuracy under circumstances when progressing wear, manufacturing and/or assembly tolerances and/or changes in the composition of hydraulic fluid can and normally do greatly influence the operation of heretofore known and utilized pressure regulating systems.

An additional object of the invention is to provide an apparatus for the practice of the above outlined method.

Another object of the invention is to provide a relatively simple, compact, reliable and long-lasting apparatus for controlling the operation of pressure regulating valves in the power trains forming part of motor vehicles and employing automated clutches and/or transmissions.

Still another object of the invention is to provide a novel and improved combination of an electronic control unit and one or more sensors which monitor the pressure, the temperature, the torque, the wear, the RPM and/or other variables that are likely or bound to adversely influence the accuracy of operation of pressure regulating valves in the power trains of motor vehicles and/or under numerous other circumstances of use.

SUMMARY OF THE INVENTION

One feature of the present invention resides in the provision of a method of conforming to varying parameters a selected electric control current which is being supplied to a fluid pressure regulating valve (e.g., to an electromagnet of such valve) and is memorized with additional control currents as a desired control current in and is withdrawable (e.g., addressable) from a characteristic field in a memory, as a function of prevailing operating conditions, to serve as an actual control current. The improved method comprises the steps of (a) superimposing upon one of the actual control current and a modulating current having a predetermined amplitude the other of the actual control current and the modulating current, (b) ascertaining a pressure amplitude which is brought about by the modulating current, (c) comparing the ascertained amplitude with a predetermined pressure amplitude, and (d) correcting (in a sense to reduce the extent of the aforementioned departure) the characteristic field upon detection of a departure of ascertained amplitude from the predetermined amplitude.

The electric control current can be supplied from an outlet of a control circuit to an input of a clutch pressure regulating valve.

The modulating current is (or can be) an alternating current, and the superimposing step can include superimposing the modulating current upon the selected actual control current in the course of several periods, and such method can further comprise the step of averaging the amplitudes of signals being transmitted by a fluid pressure sensor during the aforementioned several priods. The correcting step can be carried out as a function of the amplitide of the averaged signal.

The improved method can also comprise the step of determining correction values for at least two different pressures being regulated by the pressure regulating valve.

The arrangement can be such that the correcting step can be carried out only if during the superimposing step the desired control current changes by less than a predetermined value.

The superimposing step can be carried out at different temperatures.

The pressure regulating valve can be installed in a power train of a motor vehicle; under such circumstances, the regulating valve can constitute a clutch regulating valve, and the power train can comprise a manually shiftable change-speed transmission.

The memory can form part of an electronic control circuit which is arranged to receive signals from a plurality of sensors for transmitting to the control circuit signals denoting changes of various parameters of constituents of a motor vehicle.

Another feature of the invention resides in the provision of an apparatus for conforming to varying parameters an electric control current for at least one fluid pressure regulating valve. The improved apparatus comprises a fluid pressure regulated actuating arrangement (such as at least one constituent of a prime mover in a motor vehicle) which is regulated by the pressure of fluid being supplied by the at least one valve, a plurality of sensors which are arranged to monitor different variable parameters of the actuating arrangement and to transmit signals denoting the variations of the respective parameters, and a control unit having inputs for signals from the sensors and including at least one memory for a characteristic field of fluid pressure changes, an output connected to a current-consuming element of the at least one valve, and means for modifying memorized pressure changes in response to signals from the sensors.

The actuating arrangement can include a clutch, such as an automated clutch in the power train of a motor vehicle; such power train can further comprise a manually shiftable transmission.

The sensors can include at least one pressure monitoring sensor, at least one temperature monitoring sensor and/or at least one RPM monitoring sensor. Furthermore, at least one of the sensors can be set up to monitor the rate of fuel admission to the prime mover of a motor vehicle.

The modifying means of the control unit can include means for modifying memorized pressure changes in a stepwise fashion and, if desired and/or necessary, in a succession of stages.

The modifying means can comprise means for comparing the memorized pressure changes with required pressure changes reflecting the signals from one or more sensors and for modifying the memorized pressure changes when the comparison indicates the existence of predetermined differences between the memorized pressure changes and the required pressure changes. The means for modifying can be arranged to modify memorized pressure changes in a sense to reduce the differences between the modified pressure changes and the required pressure changes.

The novel features which are considered as characteristic of the invention are set forth in particular in the appended claims. The improved apparatus itself, however, both as to its construction and the mode of assembling the same and the methods which can be practiced therewith, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
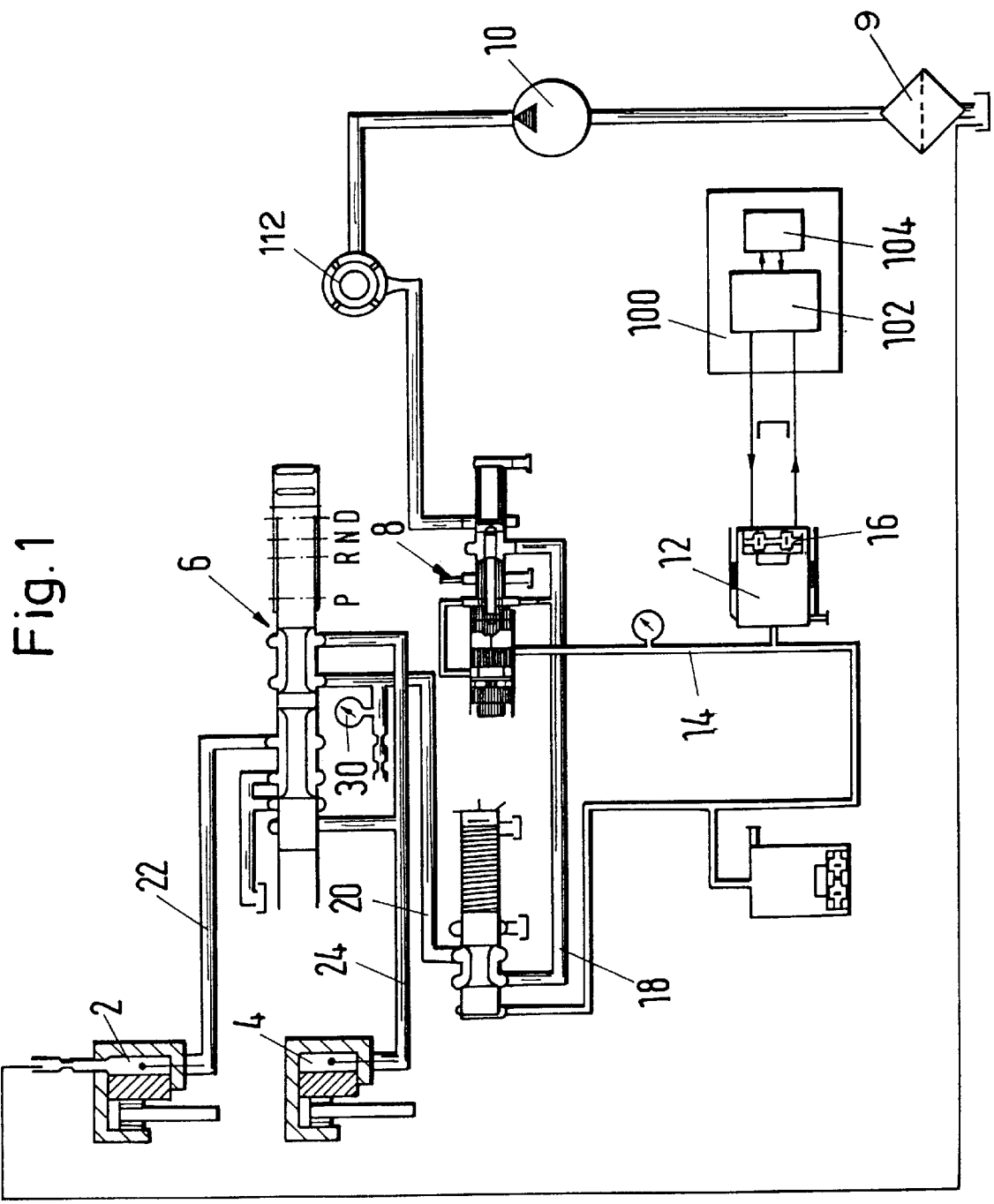
FIG. 1 is a fragmentary schematic partly elevational and partly sectional view of a power train which is embodied in a motor vehicle and serves to regulate the pressure of hydraulic fluid in conduits connecting a source of hydraulic fluid with several units being operated by pressurized hydraulic fluid and forming part of a continuously variable transmission.

FIG. 1 shows certain constituents of a continuously variable transmission (CVT) which can be put to use in the power train of a motor vehicle. The transmission comprises an adjustable driving pulley or sheave on a first shaft, an adjustable driven pulley or sheave on a second shaft, and an endless flexible torque transmitting element (for example, a so-called side-bar chain disclosed in U.S. Pat. No. 4,581,001 granted Apr. 8, 1986 to Rattunde et al. for "SIDE-BAR CHAIN FOR INFINITELY VARIABLE CONE-PULLEY TRANSMISSIONS" or in U.S. Pat. No. 5,728,021 granted Mar. 17, 1998 to van Rooij et al. for "TRANSMISSION CHAIN FOR A CONE PULLEY TRANSMISSION"). The first shaft can receive torque from a prime mover (such as the combustion engine in the power train of a motor vehicle), and the second shaft can transmit torque to the input element of an adjustable constituent, e.g., the input element of a differential which transmits torque to the driven axles for the front or rear wheels of the motor vehicle. Reference may be had, for example, to commonly owned U.S. Pat. No. 5,046,991 granted Sep. 10, 1991 to Friedmann for "CONTINUOUSLY VARIABLE SPEED TRANSMISSION", to commonly owned U.S. Pat. No. 5,169,365 granted Dec. 8, 1992 to Friedmann for "POWER TRAIN", to commonly owned U.S. Pat. No. 5,217,412 granted Jun. 8, 1993 to Indlekofer et al. for "CONTINUOUSLY VARIABLE SPEED TRANSMISSION", to commonly owned U.S. Pat. No. 5,295,915 granted Mar. 22, 1994 to Friedmann for "CONTINUOUSLY VARIABLE SPEED TRANSMISSION", to commonly owned U.S. Pat. No. 5,667,448 granted Sep. 16, 1997 to Friedmann for "POWER TRAIN", and to commonly owned U.S. Pat. No. 5,711,730 granted Jan. 27, 1998 to Friedmann et al. for "TORQUE MONITORING APPARATUS".

The disclosures of the above-enumerated patents, as well as of all other U.S. and foreign patents and/or patent applications (this includes that of the commonly owned German priority patent application Serial No. 198 37 157.9-52 filed Aug. 17, 1998) which are identified in this specification are incorporated herein by reference.

The apparatus which is shown in FIG. 1 comprises a first hydraulic cylinder and piston unit 2 which serves to actuate a reverse clutch (not shown), a second cylinder-and-piston unit 4 which serves to actuate a forward clutch (not shown), and a shifting valve 6 which serves to shift the transmission into a selected gear (such as P, R, N or D). Depending upon the setting of the shifting valve 6, the units 2 and 4 receive pressurized hydraulic fluid by way of a clutch pressure regulating valve 8. The valve 8 receives pressurized hydraulic fluid (such as oil) from a pump 10 by way of a filter 112.

The valve 8 regulates the fluid pressure in dependency upon a pilot pressure which is determined by a pilot valve 12 serving as a pressure regulating valve. The heretofore described parts and their mode of cooperation are well known in the art.

The pilot valve 12 (acting as a pressure regulating valve) is designed as a proportioning valve which regulates the pilot pressure of fluid in a conduit 14 as a function of the strength of a current I in a coil or winding of an electromagnet forming part of the valve 12. The valve 12 selects the output pressure of fluid flowing from the clutch pressure regulating valve 8 into the conduits 18 and 20 and thence into the shifting valve 6 which directs the fluid selectively into the cylinder-and-piston units 2 and 4, respectively.

An adaptation of fluid pressure amplitudes is carried out by a control unit 100 including a microprocessor 102 and at least one memory 104. Information denoting the difference of pressure amplitudes between a desired and an actual amplitude is stored in the memory 104 and can be addressed whenever necessary.

Figure 2:
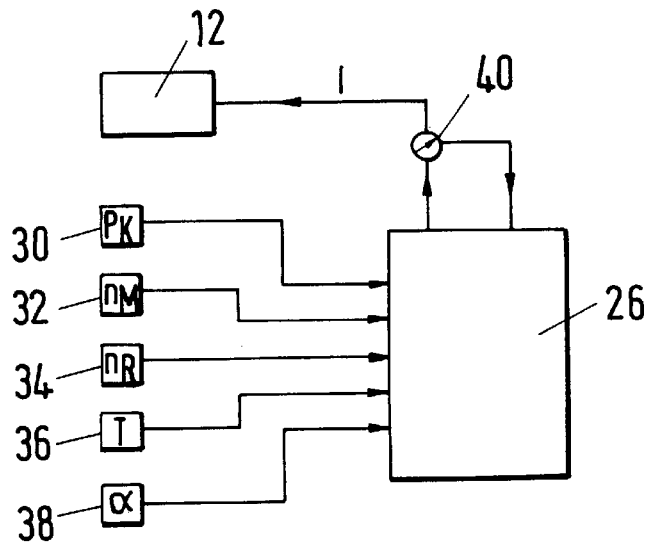
FIG. 2 is a diagrammatic view of a combination of an electronic control unit and several sensors which can be utilized in the power train of FIG. 1 and/or elsewhere.

FIG. 2 is a block diagram of a control unit 26 which can be utilized as the control unit (100) for the pilot valve of the apparatus shown in FIG. 1. The control unit 26 comprises a microcomputer (corresponding to the part 102 of the control unit 100 shown in FIG. 1) and one or more associated memories or storages (corresponding to the memory 104 of the control unit 100). The control unit 26 of FIG. 2 has several inputs which are connected to the signal transmitting outputs of signal generating sensors 30, 32, 34, 36 and 38. The sensor 30 monitors the pressure of fluid which is being supplied to the chamber of the cylinder forming part of the cylinder-and-piston unit 2 or 4. As shown in FIG. 1, the sensor 30 can be installed in or operatively connected with the conduit 20 leading from the clutch pressure regulating valve 8 to the shifting valve 6. The sensors 32, 34, 36 and 38 respectively transmit (to the corresponding inputs of the control unit 26) signals denoting the RPM of the prime mover (such as a combustion engine) which drives the first or input shaft of the continuously variable transmission (see, for example, the prime mover PM in FIG. 1 of the '991 patent to Friedmann); the RPM of a driven wheel of the motor vehicle embodying the combustion engine; the temperature of the engine, of the clutch and/or of oil in the sump (see the oil sump 9 in FIG. 1); and the momentary rate of fuel admission to the engine (e.g., by monitoring the position (the extent of depression and/or inclination) of the gas pedal).

The memory (or at least one of several memories) of the control unit 26 stores a characteristic field containing information pertaining to the desired or required current $I_S$ to be supplied to the aforementioned winding of the electromagnet forming part of the valve 12, namely the current being supplied to the aforementioned winding when the sensor 30 transmits a signal denoting the appropriate fluid pressure in the conduit 22 or 24 leading to the respective unit 2 or 4. The signal being actually transmitted by the sensor 30 is compared with the required signal stored in the memory (or at least one of the memories) of the control unit 26. To this end, the output of the control unit 26 (namely an output leading to the electromagnet of the valve 12) contains an ammeter 40 which transmits to a further input of the control unit 26 signals denoting the strength of the current being actually supplied to the electromagnet of the valve 12; if the characteristics of such current deviate from the characteristics of the then desired or required current, the control unit 26 effects the necessary changes to ensure that the characteristics of the current in the conductor containing the ammeter 40 do not deviate from the characteristics of desired current (or that the deviation remains within an acceptable range).

The aforementioned characteristic field which is stored in the single memory (or in at least one of several memories) of the control unit and denotes currents having the desired or required characteristics can be set up and/or stored in any one of numerous suitable manners. It can take the form of a characteristic curve denoting the $I_S$ as a function of the engine torque; for example, such engine torque can be ascertained on the basis of the RPM ($n_M$) of the engine and the position (e.g., inclination) of the gas pedal. The thus calculated or ascertained desired current $I_S$ is thereupon corrected (altered) in correspondence with the ascertained engine RPM or $n_M$ (sensor 32), the temperature T of the engine, of the clutch and/or of the oil in the sump 9 (sensor 36); and/or the RPM ($n_R$) of the wheels (sensor 34). The characteristic field denoting information which pertains to the required strength of the current $I_S$ can embrace the inputs for signals from all of the sensors 30, 32, 34, 36 and 38. This is to be interpreted as follows: The relationship of the characteristic field to the control field is such that the output value can be established for several variable values. For example, a plurality of vehicle parameters (such as RPMs, temperatures and pressures) can be mathematically related to present a single value which is utilized for the purposes of regulation.

In actual practice, it is further necessary or highly advisable to take into consideration those departures of the actual current $I_S$ to the electromagnet of the valve 12 from the desired or ideal current which departures are attributable to one or more variables including valve tolerances, changes of the hydraulic fluid and/or certain others. In accordance with a feature of the invention, the influence of such variables upon the control current being supplied to the electromagnet of the valve 12 is eliminated or weakened by resorting to a modulating current $I_M$ having a predetermined amplitude and a predetermined frequency and being superimposed upon the control current I to ascertain whether or not the pressure of clutch fluid (as determined by the sensor 30 in the conduit 20) follows or responds to the modulation of the control current with a predetermined amplitude. If such is not the case, the characteristic field stored in the single memory or in at least one of several memories of the control unit 26 is altered in a manner to be described with reference to FIG. 3.

Figure 3:
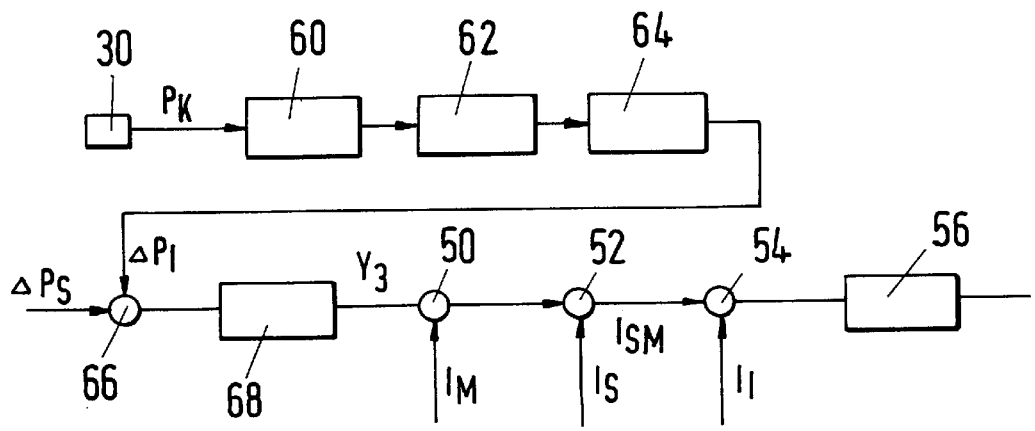
FIG. 3 is a diagrammatic view of one mode of processing signals in the control unit of FIG. 2.

The step denoted by the block 50 in the diagram of FIG. 3 involves a determination (in the characteristic field memorized in the control unit 26) of a modulating current $I_M$ which can depend from the then supplied desired control current $I_S$ and from the then prevailing temperature T of the engine (and/or of the clutch and/or of the oil in the sump 9) and is attributable to non-linearity of the behavior of the pressure regulating valve 12 and/or the clutch pressure regulating valve 8. The frequency of the modulating current $I_M$ is higher than the speeds of changes normally prevailing in the clutch pressure regulating system; for example, such frequency can be in the range of 600 Hz. This modulation frequency is preferably in the range of between about 30 and 1000 Hz, more preferably within the range of between about 50 and 100 Hz and most preferably about 75 Hz.

The amplitude depends upon the then desired control current $I_S$ and the temperature. The step denoted by the block 52 in FIG. 3 represents the superimposition of the modulating current $I_M$ upon the desired current $I_s$. The next step (see the block 54 in FIG. 3) denotes a determination of deviation or departure (if any) of the modulated desired current $I_{SM}$ from the then existing desired current $I_l$. This enables a current regulator 56 to adjust the current being then supplied to the pressure regulating valve 12 to conform to the modulated desired control current $I_{SM}$.

The pressure sensor 30 transmits an output signal $P_K$ which fluctuates in accordance with the modulated desired control current $I_{SM}$. The output signal $p_K$ from the sensor 30 is transmitted to the filter 60, such as a low-pass or a band-pass filter, and the filtered signal is thereupon processed in a MIN-MAX memory 62 in the following way:

The MIN-MAX memory 62 stores the maximum value of the oscillating pressure signal being transmitted by the filter 60, as well as the minimum value, e.g., for five periods. This is but one of the undertakings for the determination of the amplitude.

The memory 62 transmits signals to an averaging circuit 64 which averages by calculation the maximum-value signals as well as the minimum-value signals and deducts one of the averaged signals from the other averaged signal. This ensures that the output of the averaging circuit 64 transmits a signal $\Delta p_1$ denoting the ascertained pressure amplitude. Such actual or existing pressure amplitude $\Delta p_1$ is compared (at the signal comparing stage 66) with desired pressure amplitude $\Delta p_s$ which is furnished by the memory (or by one of the memories) of the control unit 26 as a function of the desired modulation current $I_{SM}$. In the event of a deviation of $\Delta p_1$ from $\Delta p_S$, a computer 68 of the control unit 26 calculates an incremental adaptation parameter $Y_3$ which serves to correct (at 50) the predetermined modulation current $I_M$ in a sense to reduce the deviation of $\Delta p_S$ from $\Delta p_1$. The just described adaptation procedure can be repeated until the deviation of $\Delta p_1$ from $\Delta p_S$ is not outside of a predetermined value, i.e., until the just mentioned deviation is within a preselected range.

In order to enhance the functional reliability of the improved method and apparatus, one can equip the control unit 26 with suitable software which renders it possible to practice the improved method in such a way that the adaptation parameter $Y_3$ is ascertained only in the event that, during evaluation of the modulated clutch pressure $p_K$ at 62, 64 and 66, the desired or required current $I_S$ to be supplied to the electromagnet of the valve 12 undergoes a change below a predetermined value.

The ascertained adaptation parameter $Y_3$ is taken into consideration for the characteristic field which is stored in the single memory (or in at least one of plural memories) of the control unit 26 and stores information pertaining to the desired current $I_S$ to be supplied to the electromagnet of the pressure regulating valve 12. This ensures that the characteristic field for the storage of information to be addressed for a determination of current to be supplied to the winding of the electromagnet in the valve 12 conforms to or is furnished by taking into consideration the varying tolerances and/or any other parameters which vary or are expected to vary in actual use of the valve 12. This, in turn, ensures that the desired current $I_S$ being supplied (via ammeter 40 of FIG. 2) to the pressure regulating valve 12 guarantees the establishment of a desired clutch pressure for the cylinder-and-piston unit 2 or 4.

Conformance of the control current is preferably carried out during those stages of operation of the clutch when the valve 6 is set to select the gear ratio D and the prevailing operating temperature is within a predetermined range, for example, between −5° C. and +60° C. It is also possible to employ several temperature windows, each with a lower and an upper threshold value.

The calculation of the adaptation parameter $Y_3$ can be carried out for different pressure intervals of the clutch pressure $p_K$. Thus, different adaptation parameters $Y_3$ can be made available for different pressure intervals with linear interpolation between them. Furthermore, an adaptation parameter $Y_3$ can be calculated for each of various temperatures so that one can set up a characteristic field which furnishes an adaptation parameter in dependency on the clutch pressure $p_K$ and/or desired current $I_S$ and temperature and is continuously actualized (updated) while the control unit 26 is in use.

Figure 4:
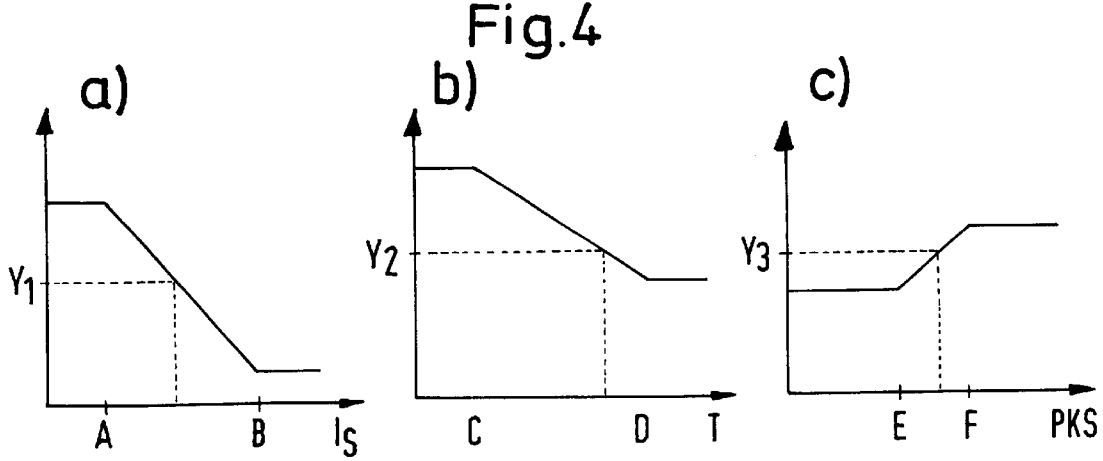
FIGS. 4(a,b,c) shows three coordinate systems with curves denoting variations of adaptation parameters in dependency upon variations of desired current, temperature and pressure.

The coordinate systems of FIG. 4 show schematically correction factors (i.e., adaptation parameters) which serve to conform a preselected amplitude of the modulation current $I_M$ to circumstances prevailing during actualizing of the conformance parameter Y.

The curve in the coordinate system a of FIG. 4 represents a first conformance parameter $Y_1$ in dependency upon the desired current $I_s$. As shown, $Y_1$ is constant when the desired current $I_S$ is below a value A as well as above a value B and is linearly interpolated between the values A and B. It is (or it can) also be advisable that (in a different embodiment) the conformance parameter $Y_1$ progress in a different way; for example, $Y_1$ can change continuously (gradually) or in a stepwise fashion.

The curve in the coordinate system b of FIG. 4 represents a conformance parameter $Y_2$ which can be resorted to in order to conform the amplitude of the modulation current to the prevailing temperature T. As shown in the coordinate system b of FIG. 4, $Y_2$ has a relatively high constant value below a temperature C and a relatively low constant value above a temperature D. $Y_2$ is linearly interpolated between the temperatures C and D. It is further possible (and often advantageous) that, in another embodiment, the value of $Y_2$ changes in such a way that it varies gradually (continuously) or stepwise in response to gradual changes of the temperature T. Additional types of changes of $Y_2$ in response to changes of the temperature T are also within the purview of the present invention.

The curve in the coordinate system c of FIG. 4 represents changes of the conformance parameter $Y_3$. Thus, when the desired fluid pressure $p_{KS}$ is below a predetermined value E or above a predetermined value F, $Y_3$ remains constant. $Y_3$ is relatively low below the predetermined value E but is relatively high above the preselected value F. The value of $Y_3$ is linearly interpolated in response to gradual change of pressure $P_{KS}$ from the value E to the value F.

It is equally within the spirit and scope of the invention to select at least one further progress of changes of the performance parameter $Y_3$. Thus, the value of $Y_3$ can vary gradually (continuously) or stepwise in response to gradual rise of the fluid pressure $p_{KS}$. Referring again to FIG. 3, with simultaneous reference to the coordinate system c in FIG. 4, the sensor 30 ascertains the pressure $p_K$ below the value E and the control unit 26 is set up to assume that $p_K$ is constant below the value E, and the sensor 30 also ascertains the value of $p_K$ above F and the control unit 26 assumes that the pressure $p_K$ is constant above F. A linear interpolation of $Y_3$ takes place between the values E and F.

It will be appreciated that it is not absolutely necessary to invariably interpolate linearly between two preselected values of pressure $p_K$ (e.g., between 3 and 6 bar and between 9 and 11 bar, 3 bar being the value E and 9 bar being the value F of $p_K$, i.e., of actual clutch pressure). It is often advisable to incur the expenditures for the carrying out of the changes of conformance parameter $Y_3$. Thus, it is possible to ascertain $Y_3$ for a plurality of pressure intervals so that the curve denoting the values of $Y_3$ in the coordinate system c of FIG. 4 consists of two or more stepped sections.

That amplitude ($A_M$) of the modulation current $I_M$ which is to ensure a predetermined amplitude of pressure fluctuations $\Delta p_s$ can be calculated multiplicatively, on the basis of the three conformance parameters $Y_1$, $Y_2$ and $T_3$ and a predetermined amplitude A, in accordance with the equation $$A_M = A \times Y_1 \times Y_2 \times Y_3.$$

To summarize, the method and the apparatus of the present invention can be resorted to in order to conform a control current $I_C$ for a pressure regulating valve, especially a clutch pressure regulating valve (such as 8) to varying parameters. The method includes the step of addressing a characteristic field, which is stored in a memory and can furnish information pertaining to a plurality of desired control currents. The thus obtained value of the control current conforms to the then prevailing operating conditions and is treated as a desired control current. A signal denoting a modulation current having a predetermined amplitude is superimposed upon the signal denoting the desired control current, and the next step involves the ascertainment of the pressure amplitude which is obtained as a result of the superimposing step; the thus ascertained pressure amplitude is compared with a desired amplitude corresponding to the predetermined amplitude of the desired pressure. The characteristic field of control currents is corrected, in a sense to reduce the extent of departure, in the event of a departure of the actual pressure amplitude from the amplitude of the desired pressure.

Figure 5:
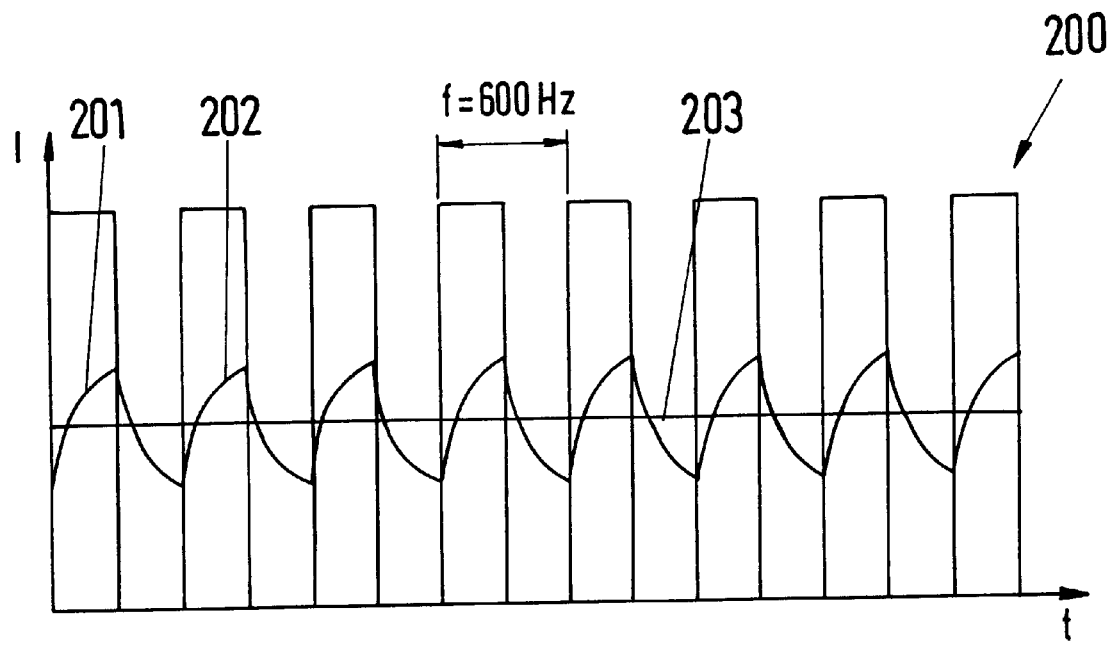
FIG. 5 shows a coordinate system wherein the curves denote the relationship between changes of current and changes of time.

In the coordinate system 200 of FIG. 5, current I (see the curve 201) is measured along the ordinate and the time t is measured along the abscissa. The curve 202 denotes the variations of current I when the valve is regulated with a scanning ratio at a frequency of, for example, 600 Hz. The current strength I increases or decreases in a phasewise fashion. The curve 203 denotes the average strength of the current. However, owing to the modulation, the amplitude of the pressure remains unchanged.

Figure 6:
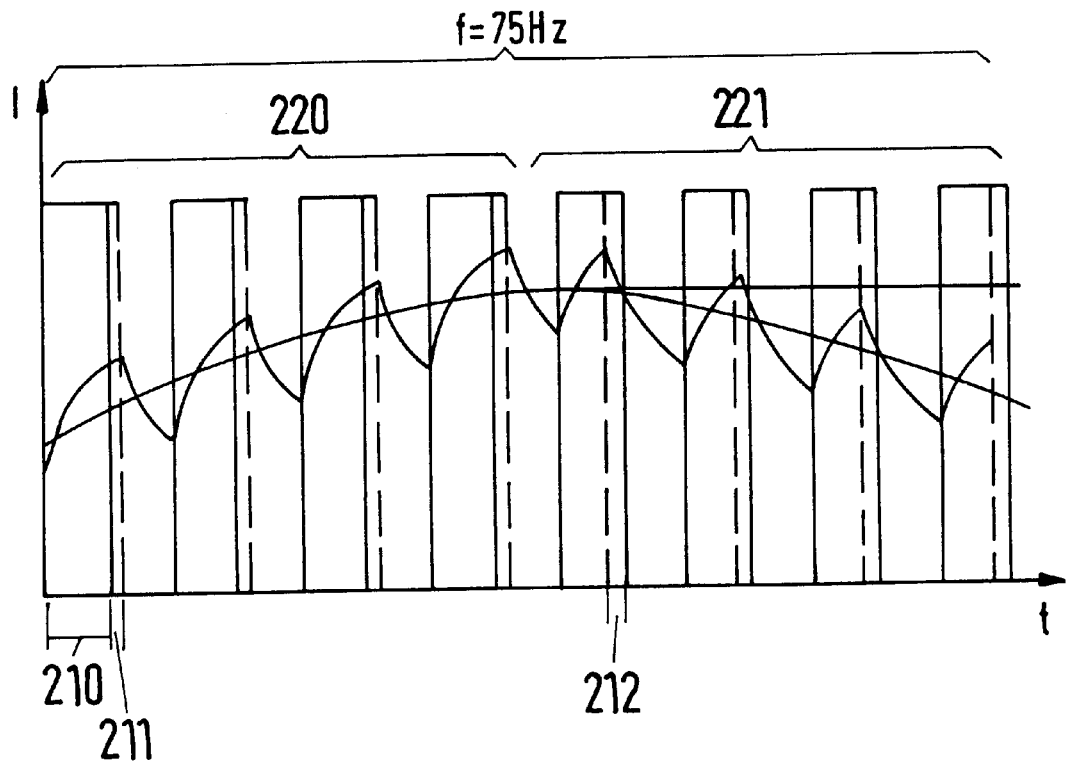
FIG. 6 shows a coordinate system where the curves also denote the relationship between the changes of current and changes of time.

If, under different circumstances, a regulation of pressure amplitude is to take place adaptively, it. is possible to proceed in a manner as shown in the coordinate system of FIG. 6. Thus, a frequency modulation (for example, at 600 Hz) is underimposed (such as additively superimposed) to a whole multiple, e.g., 75 Hz. This entails that an interval 211 is added to the monitoring ratio 210. The result is that the average strength of the current rises.

Within the time range 221, an interval 212 is deducted which results in a drop of average current strength. Such superimposition brings about a modulation of the average current strength. By appropriate selection of the additive or subtractive scanning ratio 211 or 212, one can achieve a modulation of the current ratio to the desired value.

Reference should be had also to the commonly owned German patent application Serial No. 197 27 350; the disclosure of this application should be interpreted as having been incorporated herein by reference.

An important feature of the improved method and apparatus is that, in addition to heretofore considered parameters (such as the desired average current, the desired average control pressure of hydraulic fluid and/or the temperature), the current being supplied to the ammeter 40 and thence to the electromagnet(s) of the valve 12 is also influenced by pressure amplitude which develops as a result of modulation of the control current.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of methods of and apparatus for regulating the operation of pressure regulating valves and, therefore, such adaptations should and are intended to be comprehended within the meaning and range of equivalence of the appended claims.

What is claimed is:

1. A method of conforming to varying parameters a selected electric control current which is being supplied to a fluid pressure regulating valve and is memorized with additional control currents as a desired control current in and is withdrawable from a characteristic field in a memory, in dependency upon prevailing operating conditions, to serve as an actual control current, comprising the steps of:

superimposing upon the actual control current a modulating current having a predetermined modulation amplitude;

ascertaining a fluctuation amplitude of the fluid pressure which is brought about by the modulating current;

comparing the ascertained fluctuation amplitude with a predetermined fluctuation amplitude; and correcting the characteristic field upon detection of a departure of the ascertained fluctuation amplitude from the predetermined fluctuation amplitude in a sense to reduce the extent of said departure, wherein the modulating current is an alternating current with a single predetermined oscillation frequency and said superimposing step includes superimposing the modulating current in the course of several oscillation periods, and wherein the method further comprises the step of averaging the amplitudes of signals being transmitted by a fluid pressure sensor during said several oscillation periods, and carrying out said correcting step as a function of the averaged signal amplitude.

2. The method of claim 1, further comprising the step of determining correction values for at least two different pressures being regulated by the pressure regulating valve.

3. The method of claim 1, wherein said correcting step is carried out only if during said superimposing step the desired control current changes by less than a predetermined value.

4. The method of claim 1, wherein said superimposing step is carried out at different temperatures.

5. The method of claim 1, wherein the pressure regulating valve is installed in the power train of a motor vehicle.

6. The method of claim 5, wherein the regulating valve is a clutch regulating valve.

7. The method of claim 5, wherein the power train comprises a manually shiftable change-speed transmission.

8. The method of claim 1, wherein the memory forms part of an electronic control circuit arranged to receive signals from a plurality of sensors for transmitting to said control circuit signals denoting changes of various parameters of constituents of an automotive vehicle.

9. An apparatus for generating an electric control current for at least one fluid pressure regulating valve and adapting said control current to varying parameters, said apparatus comprising:

a fluid pressure regulated actuating arrangement which is regulated by the pressure of fluid supplied by said at least one valve;

a plurality of sensors arranged to monitor different variable parameters of the actuating arrangement and to transmit sensor signals denoting the variation of the respective parameters;

a means for modulating the control current with a superimposed oscillation, said oscillation having a predetermined modulation amplitude and a single predetermined modulation frequency; and a control unit having:
inputs for the sensor signals;
at least one memory for a characteristic field representing fluid pressure changes as a function of changes of the electric control current;
an output connected with said at least one valve;
means for ascertaining from said sensor signals a fluctuation amplitude of the fluid pressure which is brought about by the superimposed oscillation of the electric control current;
means for averaging the fluctuation amplitude over several periods of said superimposed oscillation;
means for comparing the averaged fluctuation amplitude with a predetermined fluctuation amplitude; and
means for correcting the characteristic field upon detection of a departure of the averaged fluctuation amplitude from the predetermined fluctuation amplitude in a sense to reduce the extent of said departure.

10. The apparatus of claim 9, wherein said actuating arrangement comprises a clutch.

11. The apparatus of claim 9, wherein said sensors include at least one pressure monitoring sensor.

12. The apparatus of claim 9, wherein said sensors include at least one temperature monitoring sensor.

13. The apparatus of claim 9, wherein said sensors include at least one RPM sensor.

14. The apparatus of claim 9 wherein at least one of said sensors is arranged to monitor the rate of fuel admission to the prime mover of a motor vehicle.

15. The apparatus of claim 9, wherein said means for correcting the characteristic field operates in a stepwise fashion.

16. The apparatus of claim 9, wherein said means for correcting the characteristic field operates in a succession of stages.

17. The apparatus of claim 9, wherein said means for correcting the characteristic field becomes activated when the means for comparing indicates that a predetermined threshold value has been exceeded for the difference between the averaged fluctuation amplitude and the predetermined fluctuation amplitude.

* * * * *